United States Patent [19]
Cohen et al.

[11] 3,868,446

[45] Feb. 25, 1975

[54] THICKENED PHOSPHORUS ESTERS

[75] Inventors: Leonard Cohen; Philip B. Coulter; Bernard M. Zeffert, all of Baltimore, Md.

[73] Assignee: The United States of America as represented by the Secretary of the Army, Washington, D.C.

[22] Filed: Feb. 15, 1963

[21] Appl. No.: 259,486

[52] U.S. Cl............ 424/81, 424/83, 424/210, 424/211, 424/220, 424/221, 424/222, 260/999
[51] Int. Cl............................................. A01n 23/00
[58] Field of Search......... 167/22 B, 30 H; 424/210, 424/211, 220, 221, 222, 81, 83

*Primary Examiner*—Leland A. Sebastian

EXEMPLARY CLAIM

1. A composition of matter comprising a compound of the formula:

$$X = P (R) (Q) (R_1)$$

where R is selected from the group of alkyl and dialkylamino radicals, $R_1$ is selected from the group consisting of alkoxy and cyclohexyloxy radicals, Q is selected from the group consisting of fluoro, cyano and $- X - CH_2 - CH_2 - N (alkyl)_2$ groups, X is selected from the group consisting of sulfur and oxygen, wherein the alkyl and alkyloxy groups are of 1-4 carbon atoms, thickened with 0.1 to 2.0% by weight of a polymer selected from the group consisting of polyisobutylmethacrylate, nitrocellulose, polymethylmethacrylate, polystyrene, and poly n-butyl methacrylate.

6 Claims, No Drawings

THICKENED PHOSPHORUS ESTERS

The invention described herein may be manufactured and used by the governmental purposes with out the payment to us of any royalty thereon.

This invention relates to the thickening of phosphorus anticholinesterases. Specifically, this invention relates to the thickening of organic phosphorus esters with selected high molecular weight synthetic polymers.

The art of thickening incendiary fuels is well known as is shown by the patent of Goldenson et al., U.S. Pat. No. 2,769,697. It is also well known to thicken vesicants with synthetic polymers as is shown by the patent to Macy et al., U.S. Pat. No. 2,604,428.

We have discovered that various high molecular weight polymers thicken phosphorus esters. We have found various polymers which dissolve in and are compatible with the herein after enumerated toxic phosphorus esters.

The compositions of this invention are toxic chemical agents. When sprayed from high speed aircraft, these compositions produce 3–5 mm droplets. These droplets evaporate slower and fall faster than droplets produced by unthickened agents. Therefore, more agent is placed on the ground target.

The toxic phosphorus esters used in making our compositions are known compounds. The patent to Childs et al., U.S. Pat. No. 2,957,017 shows the preparation of one of the "G-agents." Other "G-agents" which can be used are described in the patent to Kramer U.S. Pat. No. 2,865,719. Other phosphorus esters which may be used in our compositions are of the type described by the patent to Schegk et al., U.S. Pat. No. 3,014,943 and British patent No. 797,603. Still other phosphorus esters are disclosed in patent application Ser. No. 62,305 filed on Oct. 12, 1960.

The type of compound which is thickened herein is illustrated by the following formula:

$$X = P (R) (Q) (R_1)$$

where R is an alkyl group or a dialkylamino group
$R_1$ is an alkoxy or cyclohexyloxy group
Q is a fluoro, cyano or $-X-CH_2-CH_2-N(alkyl)_2$
X is sulfur or oxygen
and wherein the alkyl groups are of 1–4 carbon atoms.

It is to be understood that the various compositions have to meet the requirements of being stable over long periods of time under a wide range of temperature conditions. For example, there can be no separation of the agent from the thickener and no chemical reaction between the components of the composition during months of storage under arctic and desert conditions. The following polymers when added to the above listed phosphorus esters in the amounts of 0.1 to 2.0% by weight have been found to meet the above military requirements.

Polyisobutyl methacrylate
Nitrocellulose
Polymethylmethacrylate
Polystyrene
Poly n-butylmethacrylate These polymers, which are commercially available, are of relatively high molecular weight in the range of about $0.5 - 8.0 \times 10^6$.

It has been found that in using the above polymers, the relatively high molecular weight polymers can be used in a lesser amount than the low molecular weight polymers to produce the same thickening effect in the phosphorus esters.

Due to the slow rate of solution of the thickener in the phosphorus esters, the thickened solutions must be made up well in advance before they are used. This rules out the thickening of the esters in the field. We have found that with the thickeners listed above a period of time of about 8 to 35 hours of constant mixing is required to put the thickeners completely into solution in the phosphorus esters. With each polymer, it is desirable to start with a finely divided form i.e. 100–300 mesh, or fine filaments if available.

EXAMPLE

A 1.1% solution of polymethyl methacrylate in isopropyl methylphosphonofluoridate is prepared by adding 0.493 g. of 200 mesh polymethyl methacrylate having a molecular weight of $5 \times 10^6$ to 45 ml of the phosphonofluoridate. The mixture is stirred for about 31 hours at a temperature of 40°–43° C.

By substituting the above listed polymers for the polymethyl methacrylate one can obtain similar thickened solutions of isopropyl methylphosphonofluoridate.

In like manner, the above procedure can be applied to:

S-diisopropylaminoethyl-O-ethyl-methylphosphonothiolate
S-diethylaminoethyl-O-ethyl ethylphosphonothiolate
S-diethylaminoethyl-O-ethyl methylphosphonothiolate
cyclohexyl methylphosphonofluoridate
ethyl dimethylphosphoramide cyanidate
S-diethylaminoethyl O-ethyl n-butyl-phosphonothiolate
S-diethylaminoethyl-S-ethyl methylphosphonothioate
S-diethylaminoethyl-O-ethyl methylphosphonothioate.

We claim:

1. A composition of matter comprising a compound of the formula:

$$X = P (R) (Q) (R_1)$$

where R is selected from the group of alkyl and dialkylamino radicals,
$R_1$ is selected from the group consisting of alkoxy and cyclohexyloxy radicals,
Q is selected from the group consisting of fluoro, cyano and $- X - CH_2 - CH_2 - N (alkyl)_2$ groups,
X is selected from the group consisting of sulfur and oxygen,
wherein the alkyl and alkyloxy groups are of 1–4 carbon atoms,
thickened with 0.1 to 2.0% by weight of a polymer selected from the group consisting of polyisobutylmethacrylate, nitrocellulose, polymethylmethacrylate, polystyrene, and poly n-butyl methacrylate.

2. A composition of matter as set forth in claim 1 in which 0.1 – 2.0% by weight of the selected polymer is used and said polymer has a molecular weight in the range $0.5 - 8.0 \times 10^6$.

3. A composition of matter comprising isopropyl methyl phosphonofluoridate thickened with 0.1 – 2.0% by weight of polymethyl methacrylate.

4. A composition of matter comprising S-diisopropylaminoethyl -O-ethyl methylphosphonothiolate thickened with 0.1 – 2.0% by weight of polyisobutyl methacrylate.

5. A composition of matter comprising S-diisopropylaminoethyl-O-ethyl-methylphosphonothiolate thickened with 0.2 – 2.0% by weight of polystyrene.

6. A composition of matter comprising S-diisopropylaminoethyl-O-ethyl methylphosphonothiolate thickened with 0.1 – 2.0% by weight of poly n-butyl methacrylate.

* * * * *